US012000204B2

(12) United States Patent
Mariani et al.

(10) Patent No.: US 12,000,204 B2
(45) Date of Patent: Jun. 4, 2024

(54) DYNAMIC FACADE SYSTEM FOR CONTROLLING SHADING

(71) Applicant: POLITECNICO DI MILANO, Milan (IT)

(72) Inventors: Stefano Mariani, Muggio' (IT); Alain Boldini, Brooklyn, NY (US); Andrea Pilla, London (GB); Matilde Tavanti, London (GB); Marco Colangelo, Cambridge, MA (US)

(73) Assignee: POLITECNICO DI MILANO, Milan (IT)

( * ) Notice: Subject to any disclaimer, the term of this patent is extended or adjusted under 35 U.S.C. 154(b) by 151 days.

(21) Appl. No.: 17/615,319

(22) PCT Filed: May 27, 2020

(86) PCT No.: PCT/IB2020/055021
§ 371 (c)(1),
(2) Date: Nov. 30, 2021

(87) PCT Pub. No.: WO2020/240433
PCT Pub. Date: Dec. 3, 2020

(65) Prior Publication Data

US 2022/0220797 A1 Jul. 14, 2022

(30) Foreign Application Priority Data

May 30, 2019 (IT) ........................ 102019000007635

(51) Int. Cl.

| | |
|---|---|
| ***E04B 1/343*** | (2006.01) |
| ***E06B 3/67*** | (2006.01) |
| ***E06B 9/24*** | (2006.01) |

(52) U.S. Cl.
CPC .............. *E06B 3/6722* (2013.01); *E06B 9/24* (2013.01); *E06B 2009/2417* (2013.01); *E06B 2009/247* (2013.01); *E06B 2009/2482* (2013.01)

(58) Field of Classification Search
CPC ................................ E06B 3/6722; E06B 9/24
See application file for complete search history.

(56) References Cited

U.S. PATENT DOCUMENTS

2007/0184238 A1 8/2007 Hockaday et al.
2013/0326974 A1 12/2013 Sung

OTHER PUBLICATIONS

Anonymous; “ne-xt facades: Proceedings of the COST Action TU1403 Adaptive Facades Network Mid-term Conference BK Books” Nov. 21, 2018; https://books.bk.tudelft.nl/index.php/press.catalog/book/660.

(Continued)

*Primary Examiner* — Basil S Katcheves
(74) *Attorney, Agent, or Firm* — Dickinson Wright PLLC; Andrew D. Dorisio

(57) ABSTRACT

A dynamic facade system for controlling shading, characterized in that said facade system comprises a block (30) composed of an outer glass panel (31), an intermediate framework (32) inside which a series of steel cables (33) are fixed, and an inner framework (34) that incorporates an inner glass panel (35); said outer glass panel (31), said intermediate framework (32) and said inner framework (34) being joined to one another: said system comprises modules (10) fixed on said cables (33); said modules (10) comprise a first outer structure (12); said first outer structure (12) comprises a frame-shaped square base (15) and at least one first wing (16); said at least one first wing (16) is movably connected to said frame-shaped square base (15) by means of a first hinge (20); characterized in that said first hinge (20) is made with a shape memory element with passive configuration.

9 Claims, 4 Drawing Sheets

(56) References Cited

OTHER PUBLICATIONS

Jungwon Yoon; "SMP Prototype Design and Fabrication for Thermo-responsive Facade Elements"; Journal of Facade Design and Engineering; Nov. 26, 2018.
Alain Boldini, et al; "Explotation of shape memory materials in sun adaptive user-controllable building facades" Nov. 21, 2018.

DYNAMIC FACADE SYSTEM FOR CONTROLLING SHADING

TECHNICAL FIELD

The present invention relates to a dynamic facade system for controlling shading.

BACKGROUND

One of the most recent and important research pathways for architecture and construction engineering has been controlling the internal environment of buildings in order to reach a certain level of comfort for the user. Various factors, such as temperature, lighting and humidity, are included in this picture.

Control is usually obtained through traditional systems that consume a significant amount of power. Within the context of green buildings aiming for zero emissions, this is no longer sustainable and therefore new paradigms are required.

Two main requirements have been identified for the application selected.

The system should respect the environment, i.e., from a technical viewpoint, it should require (almost) zero energy to be operated. This would allow the building's emissions to be limited and its energy efficiency to be increased.

The other fundamental requirement is the controllability by the user: the system should be able to respond to user input in order to comply with their needs. This is essential to reach an acceptable individual level of comfort, the conditions of which can differ, depending on the contingent situation, from those programmed.

It is immediately clear that these two main requirements are deeply conflicting: the zero-energy paradigm would require a totally passive system, which self-regulates as a function of a given external input and does not respond to the user's wishes or needs, while controllability entails an active feedback, which naturally requires energy. This opposition is indeed a major obstacle for the practical implementation of intelligent passive facades.

SUMMARY

The object of the present invention is to provide a dynamic facade system for controlling shading that requires very little energy in order to be operated.

Another object is to obtain an adequate level of comfort in different environmental conditions.

A further object is to obtain a good level of controllability by the user.

In accordance with the present invention, these and other objects still are achieved by a dynamic facade system for controlling shading, characterized in that said facade system comprises a block composed of an outer glass panel, an intermediate framework inside which a series of steel cables are fixed, and an inner framework that incorporates an inner glass panel; said outer glass panel, said intermediate framework and said inner framework being joined to one another: said system comprises modules fixed on said cables; said modules comprise a first outer structure; said first outer structure comprises a frame and at least one first wing; said at least one first wing is movably connected to said frame by means of a first hinge; characterized in that said first hinge is made with a shape memory element with passive configuration.

Further features of the invention are described in the dependent claims.

The advantages of this solution with respect to prior art solutions are several.

With the present solution, an intelligent dynamic facade is obtained, which integrates a solar shading system configured as structures with variable geometry and with shape memory. In the system proposed, sensitivity to sunlight and autonomous drive are combined with the essential features of user controllability and interaction.

Drawing its inspiration from nature, just as sunflowers turn their petals in response to sunlight, the designed shading system dynamically adapts its wings to the incoming radiation, regulating their folding/opening configuration.

This mechanism is possible due to the use of shape memory materials that possess the unique feature of memorising shapes that can be recovered through the application of external stimuli.

The shape memory polymer layer allows completely autonomous passive control of the internal conditions and zero energy drive. Moreover, the integration of an opaque internal layer activated by shape memory alloys (SMA), ensures the possible implementation of the resulting structure in real buildings, balancing comfort, wellbeing and performance (adaptive comfort) and allowing personal control of the living and working environments.

The invention allows an increase in the building's performance both in energy terms and in terms of comfort: while the outer structure allows autonomous regulation with zero energy impact, a further inner structure allows the adaptive user comfort paradigm to be applied.

Finally, its modularity allows maintenance costs to be reduced, while also facilitating accessibility.

The inner structure acts in parallel and as a complementary and opposing layer with the outer structure.

The outer structure makes it possible to obtain a device that is driven automatically based on the external environmental conditions, without the need for any interaction by the user.

BRIEF DESCRIPTION OF THE DRAWINGS

The features and the advantages of the present invention will be apparent from the detailed description of a practical embodiment thereof, illustrated by way of non-limiting example in the accompanying drawings, wherein.

DETAILED DESCRIPTION

Figure 1:
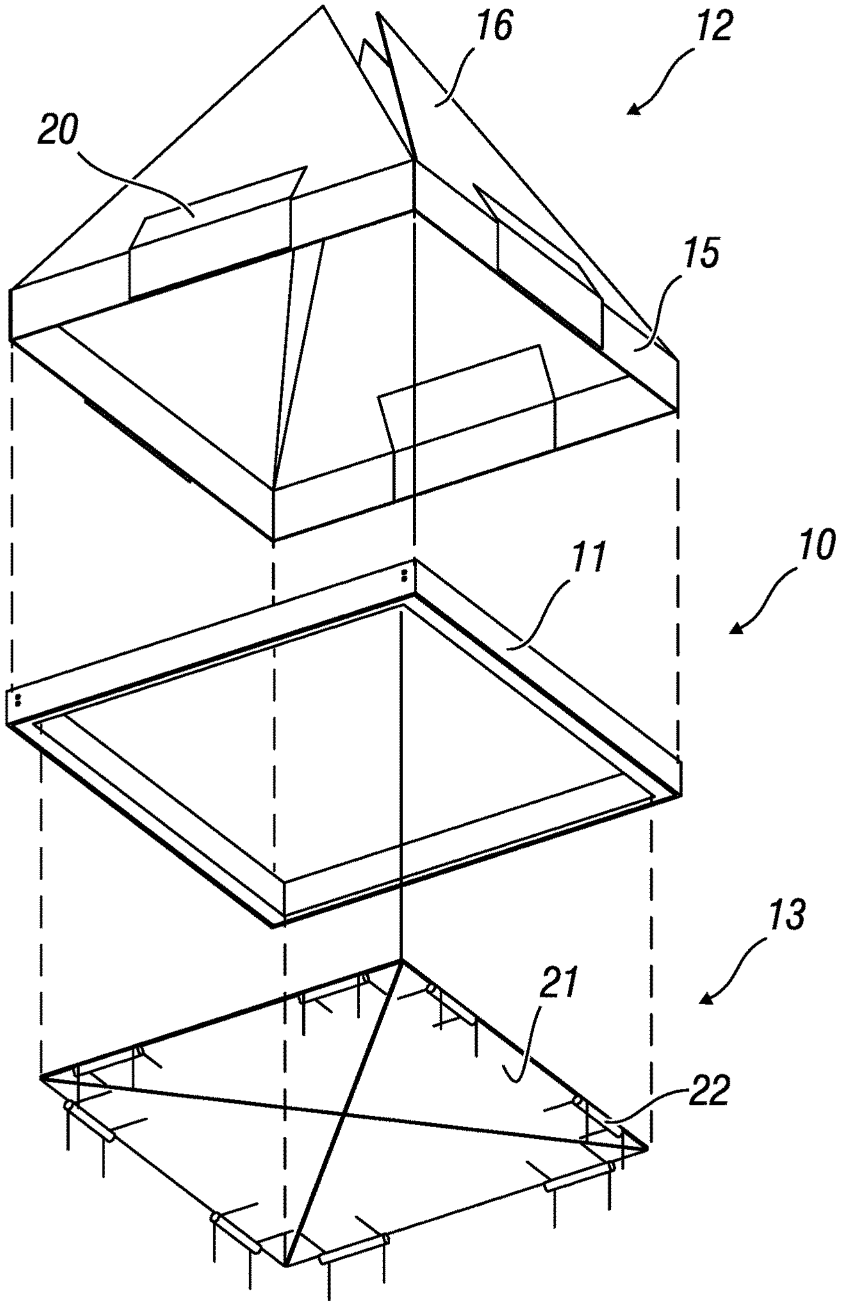
FIG. 1 schematically shows a module of a dynamic facade system for controlling shading, in accordance with the present invention.

With reference to the accompanying figures, a dynamic facade system for controlling shading, in accordance with a preferred embodiment of the present invention, is composed of a plurality of modules 10 that comprise a square framework 11 that is used to support an outer structure 12 and an inner structure 13.

The outer structure 12 comprises a frame-shaped square base 15. The base 15 can be made of plastic materials, wood or metal alloys.

A triangular-shaped wing 16 is hinged to each side of the base 15. The dimension of the wing 16 is such that by moving the four wings 16 toward one another, this forms a pyramid, with a closing angle, for example, of 60°, for aesthetic purposes, although other inclinations are possible.

The wings 16 are hinged to the base 15 by means of flexible sheets that form a hinge 20. Possible other plastic or metal hinges that are free to move can be used to reinforce the connection between the parts.

The wings 16 are preferably made of a translucent (partially transparent) plastic material, such as polycarbonate sheets, to prevent excessive darkening of the interiors when they are closed; however, other types of materials and opacities, such as perforated metal or plastic material, can be used, according to need.

The hinges 20 composed of flexible rectangular sheets are made with a shape memory element with passive configuration, such as a shape memory polymer (SMP), for example the membrane called Nafion™ N1110.

The modules 10 are positioned on the building facade, so that the SMP hinges 20 are illuminated by sunlight and hence heated by it or in any case placed in an environment whose temperature varies as the solar radiation varies.

The SMP hinges 20 have been previously trained to allow passage between two configurations, depending on the temperature. Completely open, with an inclination of approximately 90°, relative to the base plane, for low temperatures, i.e. low radiation. Completely closed, with a slope of 60°, at high temperatures, as a consequence of direct solar radiation.

The transition temperature of the SMP should be in the range 40-70° C., or more preferably 50-60° C., which represent the normal temperatures reached in facades in daily operating conditions.

In an embodiment, the base 15 is a square having a side of around 33 cm. The triangular wings 16 have a height of around 33 cm.

The SMP hinges 20, preferably one per wing 16, have a dimension, for example, of 100×60 mm.

The inner structure 13 is composed of four wings 21 which if placed side-by-side, i.e., in the closed position, form a square with same dimensions as the square framework 11.

The wings 21 are made of an opaque material (through which light radiation cannot pass), for example a black acrylic material such as PMMA, to block sunlight when closed.

The wings 21 are fixed to the square framework 11 by means of two hinges 22 per side, formed of springs 23 and 24 produced with an actuator made of shape memory alloy (SMA), for example 0.5 mm wires made of a NiTi alloy.

Each hinge 22 is produced by two opposed and adjacent springs 23 and 24. The spring 23 is wound in one direction and the spring 24 is wound in the opposite direction.

The springs 23 and 24 are connected to the wings 21 extending them. In this way a constant tension is created, producing a moment that will be present in both.

However, in this case the total moment is approximately zero due to balancing and the wing is held in a position of constant equilibrium that, with reference to the resulting positioning, corresponds to the closed position (FIG. 2*a*) where the inner structure prevents the solar radiation from entering.

The springs of the shape memory alloy hinges 22 behave as simple resistors and can be driven by electricity or alternatively by controlled temperature changes.

The material heats up, exceeds the activation temperature and returns to a previously memorised shape.

Therefore, two electrical wires are connected to each spring, one per end, which carry a current generated respectively by a generator 25 and 26 controlled by means of a respective switch 27 and 28.

Figure 2A:
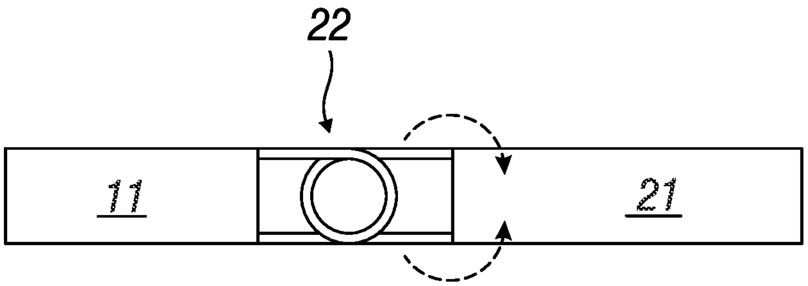
FIG. 2 schematically shows a drive system of an inner structure of a module of a dynamic facade system for controlling shading, in three different positions, in accordance with the present invention.
Figure 2B:
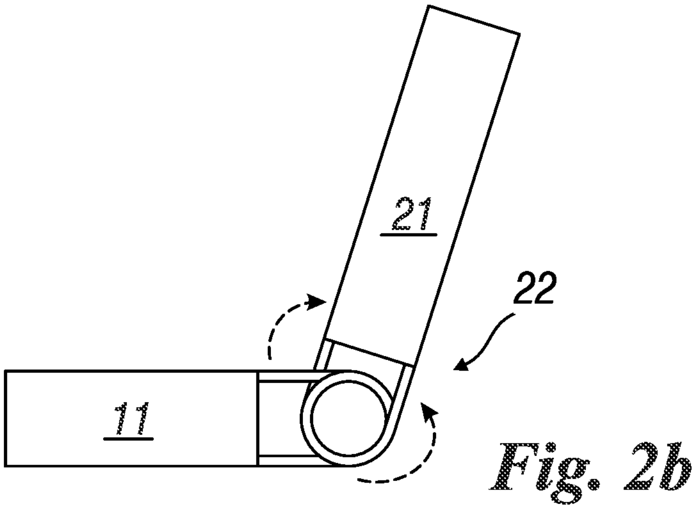

By operating the switch 27, the passage of current heats the spring 23 and consequently the wing 21 is positioned in the open position of FIG. 2*b*.

Figure 2C:
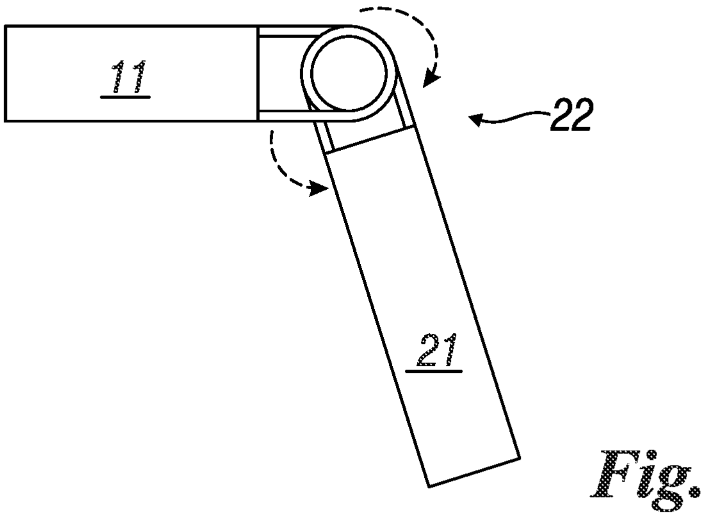
Figure 3:
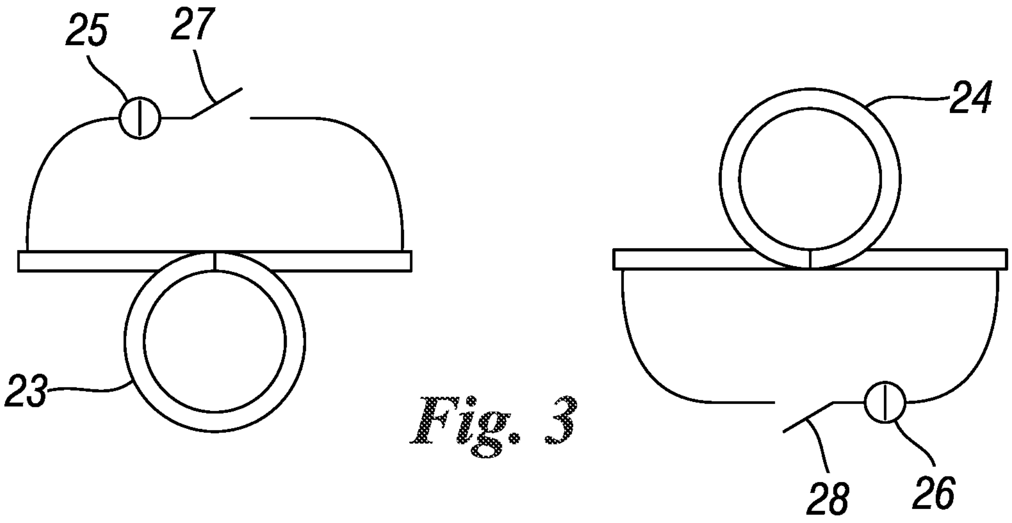
FIG. 3 schematically shows an electrical circuit of shape memory springs used as hinges of an inner structure of a module of a dynamic facade system for controlling shading, in accordance with the present invention.

By operating the switch 28, the passage of current heats the spring 24 and consequently the wing 21 is positioned in the retracted position of FIG. 2*c*.

To return it once again to the closed position of FIG. 2*a*, the opposite switch to the one previously operated is operated.

The combination of the outer structure 12, passive, and of the inner structure 13, activated by the user, allow different operating combinations of the module 10. Other combinations between the parts are possible based on the purpose of the building, by making slight changes to the configuration of both the passive and controlled drives.

Figure 4A:
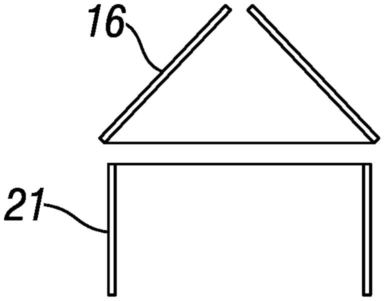
FIG. 4 schematically shows the possible positions of a module of a dynamic facade system for controlling shading, in accordance with the present invention.

Outer structure 12 closed and inner structure 13 open internally, situation of FIG. 4*a*, which allows the passage of light filtered by the outer structure 12.

Figure 4B:
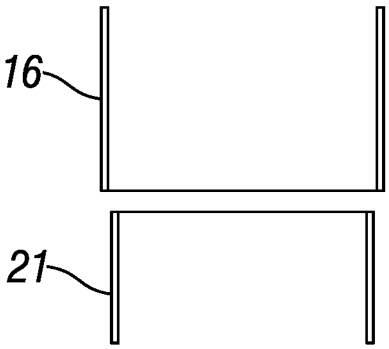

Outer structure 12 open and inner structure 13 open internally, situation of FIG. 4*b*, which allows the passage of light.

Figure 4C:
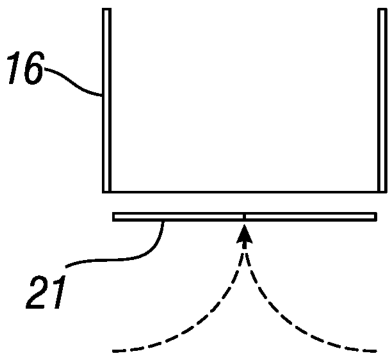

Outer structure 12 open and inner structure 13 closed, situation of FIG. 4*c*, which does not allow the passage of light.

Figure 4D:
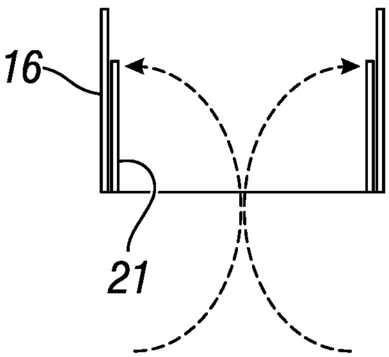
Figure 5:
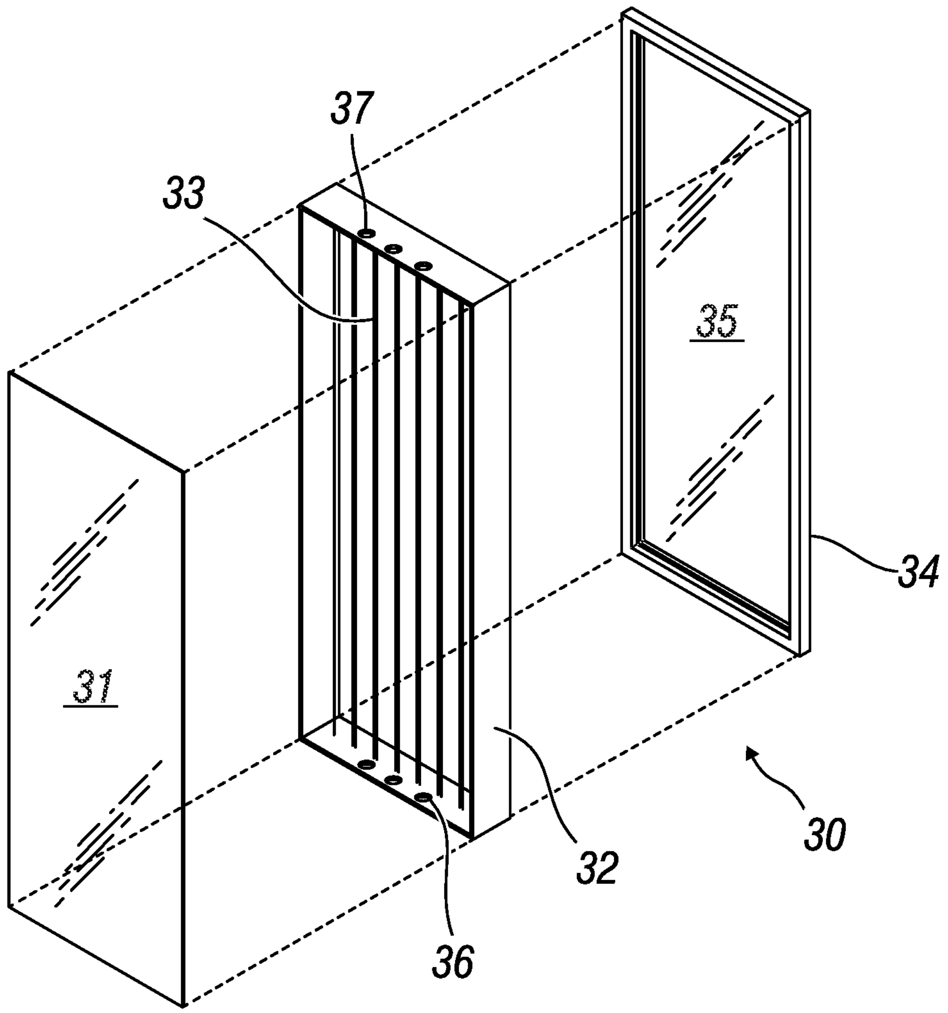
FIG. 5 schematically shows a system for containing a plurality of modules of a dynamic facade system for controlling shading, in accordance with the present invention.

Outer structure 12 open and inner structure 13 open externally, situation of FIG. 4*d*, which allows the passage of light.

To create a facade by means of the modules 10 a prefabricated block 30 has been produced.

The block 30 is composed of an outer glass panel 31, an intermediate framework 32 inside which a series of steel cables are fixed, preferably arranged vertically, and an inner framework 34 that incorporates an inner glass panel 35. These are all joined to one another to form a ventilated cavity as the intermediate framework has upper 37 and lower 36 ventilation holes.

The side walls of the modules 10 are fixed on the cables 33.

As the block 30 is a natural ventilation system, the air circulates by means of two mechanisms.

The wind that flows over the facade generates differences in pressure between the lower ventilation holes 36 and the upper ventilation holes 37, which brings about movement of the air inside.

The air flowing in through the holes 36 is heated by the sun, becoming less dense and thermally floating, rises and is expelled through the upper holes 37.

The block 30 can be made with different outer shapes, such as square, triangular, etc. Other coupling systems of the modules 10 can be used in place of the cables 33, such as another steel or acrylic substructure.

The block 30 can be ventilated in a forced manner, or be completely sealed if the temperatures reached inside allow its operation.

To create a facade, in place of the blocks 30 other methods can be used, such as fixing the modules 10 directly to transparent walls, if necessary, avoiding retracted positioning of the inner structure 13, as in the situations of FIGS. 4*a* and 4*b*.

In an alternative and simpler embodiment, the module 10 can be composed solely of the outer structure 12 and hence operate at zero energy consumption.

In the embodiment shown, both the outer structure and the inner structure comprise four triangular-shaped wings. These wings can also have other shapes and their number can differ, also differing in number between the outer structure and the inner structure, according to needs.

A single wing, or two, four or eight wings can be used, having respective shapes to allow complete closing of the module. In this case, the orientation of the sun's rays must be taken into account as the number or shape could influence the shade on the contiguous modules.

The square module envisaged can also have different geometrical shapes and different dimensions.

The hinges 22 are produced, in the example described, with an actuator made of shape memory alloy, but other actuators, such as electric actuators, can be used.

Operation of the invention is evident to the person skilled in the art from the description and in particular is as follows.

When the facade produced in accordance with the present invention is assembled, the sun's rays will directly influence opening and partial or complete closing of the wings 16 of the outer structure 12 depending on the features of the hinges 20 and on their temperature.

The user will normally maintain the wings 21 in neutral position, but can further regulate the amount of light reached inside the building by controlling operation of the hinges 22 electrically.

The invention claimed is:

1. A dynamic facade system for controlling shading, characterized in that said facade system comprises a block (30) composed of an outer glass panel (31), an intermediate framework (32) inside which a series of steel cables (33) are fixed, and an inner framework (34) that incorporates an inner glass panel (35); said outer glass panel (31), said intermediate framework (32) and said inner framework (34) being joined to one another: said system comprises modules (10) fixed on said cables (33); said modules (10) comprise a first outer structure (12); said first outer structure (12) comprises a frame-shaped square base (15) and at least one first wing (16); said at least one first wing (16) is movably connected to said frame-shaped square base (15) by means of a first hinge (20); characterized in that said first hinge (20) is made with a shape memory element with passive configuration.

2. The system in accordance with claim 1, characterized in that said at least one first wing (16) has a same dimension as said frame-shaped square base (15).

3. The system in accordance with claim 1, characterized in that said at least one first wing (16) comprises four triangular-shaped first wings (16).

4. The system in accordance with claim 1, characterized by comprising a second inner structure (13) having at least one second wing (21); said at least one second wing (21) is movably fixed to said frame-shaped square base (15) by means of a second hinge (22).

5. The system in accordance with claim 4, characterized in that said second hinge (22) is produced with an actuator made of shape memory alloy.

6. The system in accordance with claim 4, characterized in that said second hinge (22) comprises a first spring (23) and a second spring (24) opposite and alongside one another; said first spring (23) is wound in one direction and said second spring (24) is wound in the opposite direction.

7. The system in accordance with claim 1, characterized in that said at least one first wing (16) is made of a translucent plastic material.

8. The system in accordance with claim 1, characterized in that said at least one second wing (21) is made of an opaque material.

9. The system in accordance with claim 1, characterized in that said facade system comprises a plurality of said first outer structures (12).

* * * * *